United States Patent [19]

Ozawa et al.

[11] Patent Number: 5,187,531
[45] Date of Patent: Feb. 16, 1993

[54] AUTOMATIC PAPER LOADING DEVICE AND METHOD FOR PHOTOGRAPHIC PRINTER

[75] Inventors: Yoshio Ozawa; Mitsukazu Hosoya, both of Kanagawa; Takashi Matsumoto; Kimitoshi Saito, both of Saitama, all of Japan

[73] Assignee: Fuji Photo Film Co., Ltd., Kanagawa, Japan

[21] Appl. No.: 882,029

[22] Filed: May 13, 1992

[30] Foreign Application Priority Data

May 13, 1991 [JP] Japan ................... 3-137181

[51] Int. Cl.$^5$ .......................................... G03G 21/00
[52] U.S. Cl. ................... 355/308; 242/71.1; 354/21; 354/275; 354/277; 355/208; 355/72; 355/74
[58] Field of Search ........... 355/308, 309, 72, 74, 355/311, 316–317, 321, 208, 204, 203; 271/162, 9; 242/71.1, 197; 354/275–277, 21; 346/134

[56] References Cited

U.S. PATENT DOCUMENTS

| 4,218,135 | 8/1980 | Tsuda et al. ................ 355/72 |
| 4,298,276 | 11/1981 | Tsuda et al. ................ 355/72 |
| 4,605,300 | 8/1986 | Thaddey ................... 355/74 X |
| 4,741,439 | 5/1988 | Bizic ....................... 242/71.1 |
| 4,832,197 | 5/1989 | Hara .................... 242/71.1 X |
| 4,833,487 | 5/1989 | Koyanagi et al. ......... 346/134 X |
| 4,854,519 | 8/1989 | Maeda et al. ............. 242/71.1 |
| 5,006,874 | 4/1991 | Murakami et al. .......... 355/72 X |
| 5,065,180 | 11/1991 | Shindo et al. ............... 355/72 |
| 5,091,754 | 2/1992 | Abe et al. ............... 355/308 X |

FOREIGN PATENT DOCUMENTS

| 0278837 | 12/1986 | Japan ..................... 355/72 |
| 0110061 | 4/1990 | Japan ..................... 355/309 |
| 0018568 | 1/1992 | Japan . |

Primary Examiner—A. T. Grimley
Assistant Examiner—Matthew S. Smith
Attorney, Agent, or Firm—Sughrue, Mion, Zinn, Macpeak & Seas

[57] ABSTRACT

An automatic paper loading device and method wherein a paper magazine is placed on a magazine table. The table is slid toward a pair of feed rollers disposed at a paper entrance of a printer processor. While the paper magazine is moving together with the magazine table, the feed roller pair starts rotating, so that a paper leading end is nipped by the feed roller pair immediately before the paper magazine is completely set in the printer processor. A cut-out for allowing the access of the feed roller pair to the paper leading end is formed in the exit of the paper magazine. When the paper leading end has passed through the feed roller pair, the feed roller stops rotating. Then, the width of paper guide are adjusted according to paper data read from the paper magazine. After the adjustment, the feed roller pair starts rotating again, so as to feed the paper further into the printer processor.

18 Claims, 5 Drawing Sheets

AUTOMATIC PAPER LOADING DEVICE AND METHOD FOR PHOTOGRAPHIC PRINTER

BACKGROUND OF THE INVENTION

1. Field of the Invention

The present invention relates to an automatic paper loading device for photographic printers, and a method therefor. More particularly, the invention is a paper loading system which cooperates with the loading of a paper magazine into a photographic printer, and is thus automatically ready for the paper loading.

2. Description of the Related Art

A paper magazine containing a roll of photographic paper therein in light-tight fashion is set or loaded in each photographic printer. The photographic paper is drawn out of the magazine and fed to an exposure station by means of a pair of feed rollers.

In a conventional photographic printer, it is necessary to prepare the printer for paper loading before setting a paper magazine therein. That is, paper data such as paper size, surface kind, sensitivity, and the like, must be entered through a keyboard in order to achieve proper operation. A paper transport system of the printer is adjusted based on the paper data, so that the width of a paper passageway of the transporting system corresponds to the width of the photographic paper. Simultaneously, the feed rollers which are disposed proximate the exit of the paper magazine are separated from each other.

Next, the paper magazine is set in a magazine chamber such that a paper leading end protruding slightly from the exit of the paper magazine is inserted between the feed rollers. Thereafter, when a command to start the paper loading is entered through a keyboard, one of the feed rollers starts rotating and moving closer to the other feed roller, so as to nip the paper leading end and draw out the photographic paper from the paper magazine into the photographic printer.

As set forth above, paper loading in conventional photographic printers is cumbersome, because it is necessary to prepare for the paper loading by entering various data and commands through a keyboard, or the like.

SUMMARY OF THE INVENTION

In view of the foregoing, an object of the invention is to provide an automatic paper loading system, and method, for a photographic printer, which facilitates paper loading.

Another object of the invention is to provide an automatic paper loading system for a photographic printer, which automatically starts a paper loading sequence in cooperation with the placement of a paper magazine in the photographic printer.

Still another object of the invention is to provide an automatic paper loading system for a photographic printer, which detects paper data from a paper magazine and adjusts a paper transporting system according to the paper data.

To achieve the above and other objects and advantages, the present invention has a slidable magazine table for supporting a paper magazine containing a roll of photographic paper and a first sensor for outputting a first detection signal when the magazine table is slid toward a magazine final setting position. The paper magazine has a cut-out formed in a paper exit thereof, in which a leading end of the photographic paper is positioned. A pair of feed rollers, which are also positioned in the cut-out when the paper magazine reaches the magazine final setting position, are rotated in response to the first detection signal, so as to nip the paper leading end and draw the photographic paper out of the paper magazine. A second sensor is disposed downstream of the feed rollers for outputting a second detection signal when the paper leading end has passed through the feed rollers. Upon generation of the second detection signal, the feed rollers are stopped.

According to a preferred embodiment, a paper data reading device is provided for reading paper data, including paper size, from the paper magazine. After the size of a paper passageway of a paper transporting system of the photographic printer is adjusted according to the paper data, the feed rollers are again rotated to feed the photographic paper into the photographic printer.

According to the invention, the pair of feed rollers automatically starts rotating in cooperation with setting of the paper magazine in the photographic printer, and nips the leading end of the paper therebetween. Therefore, it is unnecessary to prepare the printer for the paper loading before setting of the paper magazine.

Data related to the photographic paper can be read from the paper magazine into the printer, and the paper transporting system is automatically adjusted based upon this data. Thereafter, the feed rollers begin to rotate again, so as to draw the paper out from the paper magazine and feed the paper to the exposure station. Therefore, paper loading is facilitated.

BRIEF DESCRIPTION OF THE DRAWINGS

The above and other objects and advantages of the present invention will become apparent from the following detailed description of the preferred embodiments when read in connection with the accompanying drawings, wherein like reference numerals designate like parts throughout several views, and wherein.

DETAILED DESCRIPTION OF THE PREFERRED EMBODIMENT

Figure 1:
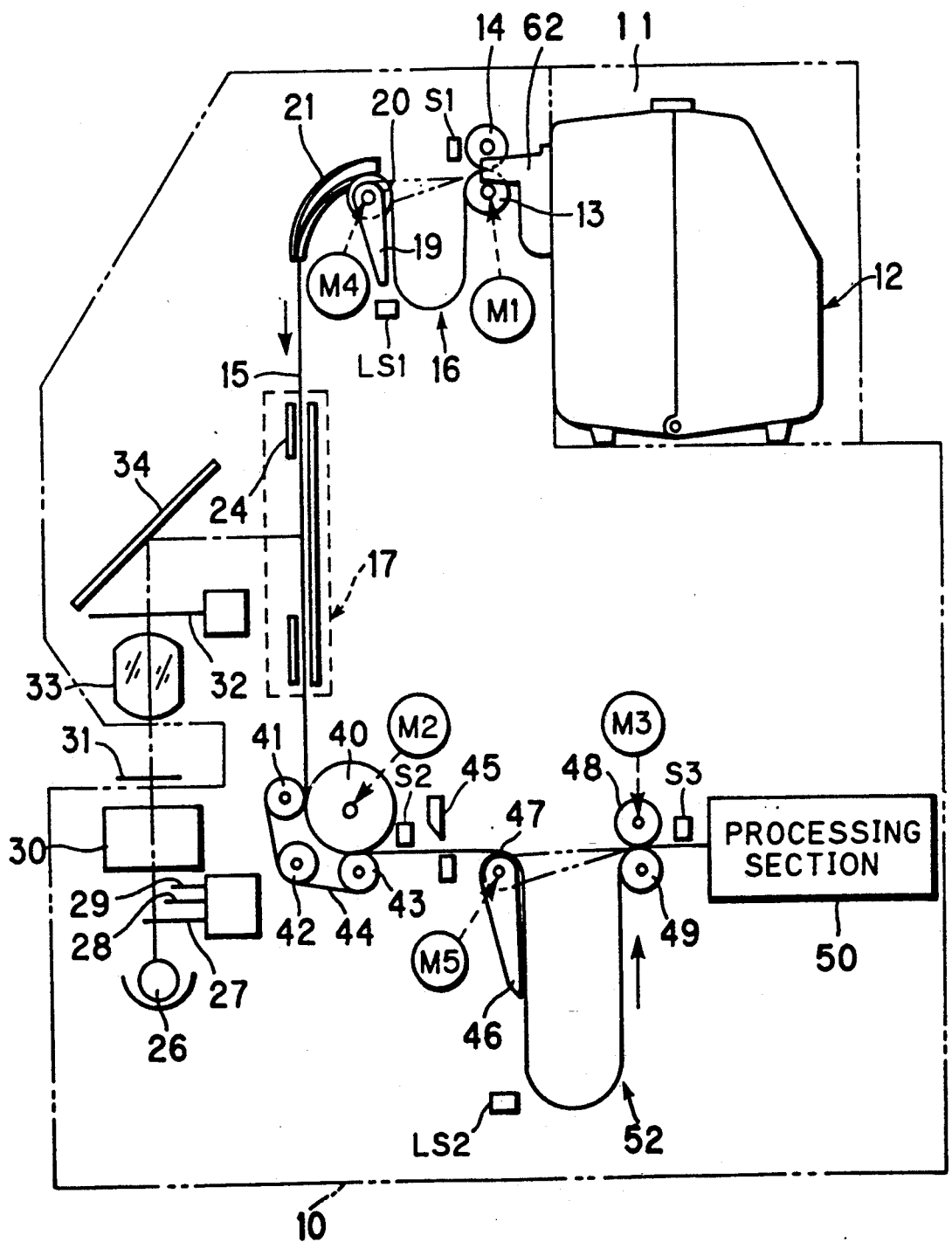
FIG. 1 is a schematic diagram showing a printer processor according to a preferred embodiment of the present invention.

In FIG. 1, a printer processor 10 is provided with a magazine chamber 11, in which a paper magazine 12 is removably set. A first pair of feed rollers 13 and 14 start rotating while the paper magazine is being set in the final position. A leading end 15a of photographic paper 15 is placed between the feed roller pair 13 and 14 (see FIG. 2). A pulse motor M1 rotates the feed roller 13 so as to draw the photographic paper 15 out from the paper magazine 12 and transport the same to an exposure station 17.

A first guide plate 19, a guide roller 20 and a paper guide 21 are disposed between the feed roller 13 and the exposure station 17. When the first guide plate 19 is moved from a first position shown by a chain-dotted line to a retracted position shown by a solid line, a first loop forming section 16 is provided between the feed roller 13 and the guide roller 20, in which an unexposed portion of the photographic paper 15 is stored. The exposure station 17 has a variable mask mechanism 24 which includes a length adjusting mask for adjusting the length of an exposure frame according to the print size, and a width adjusting mask for adjusting the width of the exposure frame according to the paper size and any required borders on the print.

Printing light projected from a light source 26 travels through cyan, magenta and yellow filters 27, 28 and 29. The insertion amounts of these filters 27 to 29 into the printing light path are adjusted according to an exposure amount, so as to control the color balance and the intensity of the printing light. The printing light passing through the filters 27 to 29 is diffused and equalized in a mixing box 30, and then illuminates photographic film 31 placed on a film carrier (not shown). Each image recorded on the photographic film 31 is focused by a printing lens 33 and directed by a mirror 34 onto the photographic paper 15 placed in the exposure station 17.

A main feed roller 40 is disposed downstream of the exposure station 17. The main feed roller 40 is driven by a pulse motor M2. An endless guide belt 44 is in contact with the main feed roller 40 by means of three rollers 41, 42, and 43. The contact area of the main feed roller 40 with the photographic paper 15 is about one fourth of the circumference thereof. A cutter 45, a second guide plate 46, a guide roller 47, and a second pair of feed rollers 48 and 49 are disposed downstream of the main feed roller 40, through which the photographic paper 15 after exposure is fed toward a processing section 50.

The second guide plate 46 is pivoted by a motor M5 from a first position shown by a chain-dotted line to a retracted position shown by a solid line, so as to provide a second loop forming section 52 for storing a loop of a portion of the photographic paper 15 after exposure. The second loop forming section 52 is adapted to absorb the difference in paper transporting speed between the printing section and the processing section 50. It is to be noted that the photographic paper 15 is fed intermittently in the printing section, and continuously in the processing section 50. The cutter 45 cuts the exposed portion of photographic paper 15 along a line between adjacent two image frames when the amount of loop stored in the second loop forming section 52 becomes less than a predetermined amount, so that the photographic paper 15 will not stop moving in the processing section 50. The feed roller 48 is driven by a pulse motor M3. Two loop sensors LS1 and LS2 detect the length of the loops formed in the first and second loop forming sections 16 and 52, respectively. Sensors S1, S2, and S3 detect the leading end 15a of the photographic paper 15 at various positions thereof.

Figure 2:
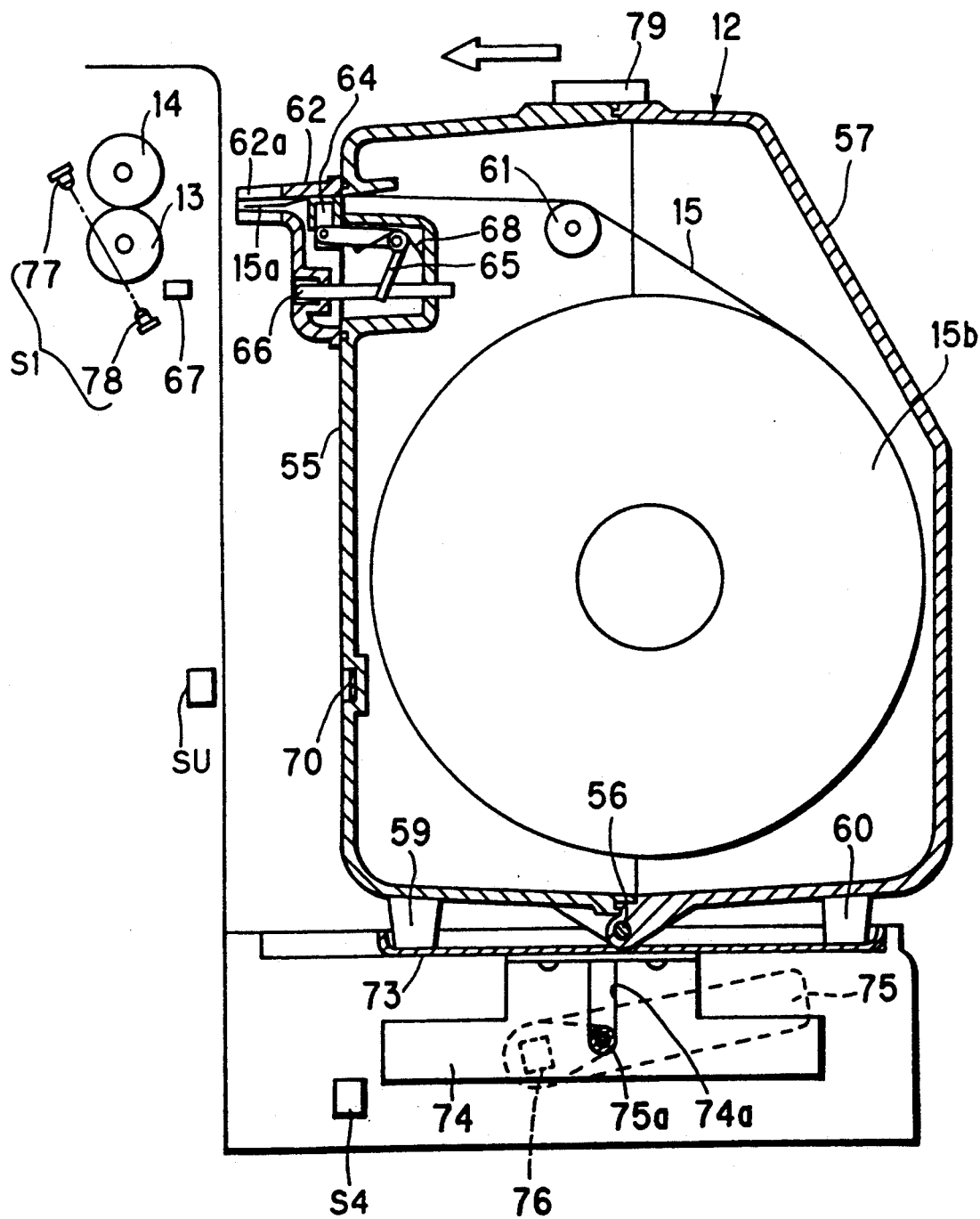
FIG. 2 is a sectional view showing the main part of a paper magazine used of the preferred embodiment.
Figure 3:
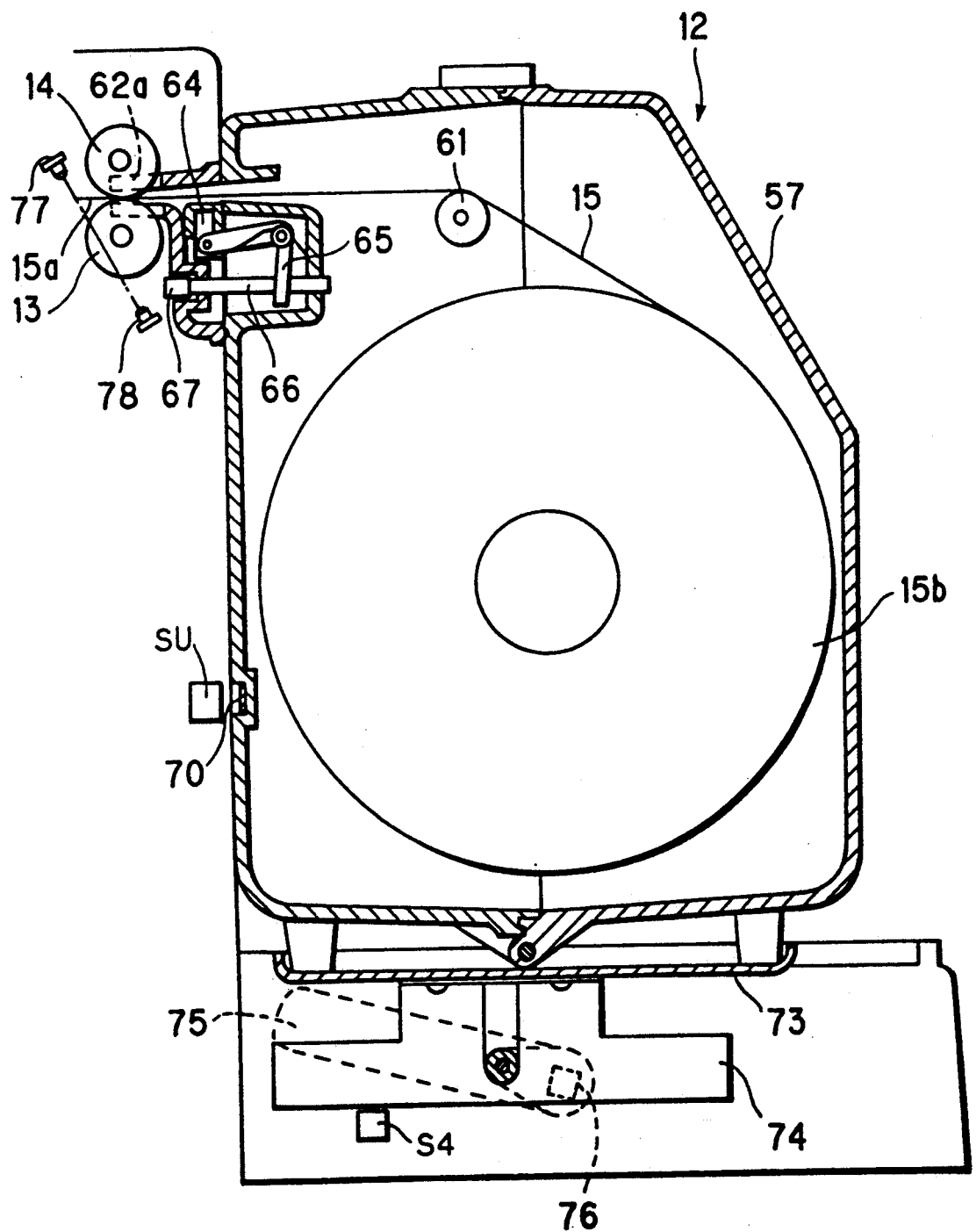
FIG. 3 is a sectional view like FIG. 2 showing the paper magazine coupled to a paper transporting device of the preferred embodiment.

Referring to FIGS. 2 and 3, the paper magazine 12 has a magazine body 55 and an openable cover 57 attached to the rear side of the magazine body 55 through a hinged joint 56. The paper magazine 12 contains a paper roll 15b of photographic paper in a light-tight fashion. Legs 59 and 60 are provided respectively on the bottoms of the magazine body 55 and the cover 57.

The photographic paper 15 drawn from the paper roll 15b is transported to a paper port 62 by a guide roller 61. The paper port 62 is secured to a front and upper portion of the magazine body 55, and is formed with a cut-out 62a at a front end thereof. The cut-out 62a allows the first feed roller pair 13 and 14 to nip the leading end 15a of the photographic paper 15 when the paper magazine 12 is set in the printer processor 10.

In order to prevent external light from entering the interior of the paper magazine 12 through the paper port 62, a light-shielding member 64 is provided in the paper port 62. The light-shielding member 64 is connected through a lever 65 to a detector pin 66 for detecting the attachment of the paper magazine 12 to the printer processor 10, and cooperates with the detector pin 66. The detector pin 66 is pushed by a projection 67 formed in the magazine chamber 11 when the paper magazine 12 is set in the printer processor 10, thereby rotating the lever 65 counterclockwise against the biasing force of a spring 68. As a result, the light-shielding member 64 opens the paper port 62 when the paper magazine 12 is set in the magazine chamber.

The magazine body 55 has a data section 70, mounted on a front wall thereof, for storing the paper size, type of paper surface, paper sensitivity, and other paper data. The paper data is read out by a sensor unit SU. According to the present embodiment, the sensor unit SU is a photo-sensor, and the paper data is optically read by the photo-sensor. However, it is possible to provide a plurality of ridges or bosses in the data section 70 and micro switches as a sensor unit SU which are turned on or off by the ridges or bosses. It is also possible to provide a contact pattern in the data section 70 and a group of contact segments in the magazine chamber 11. In addition, other known types of known data storage and reading devices may be utilized such as electronic or magnetic devices, for example.

In the lower portion of the magazine chamber 11, a magazine table 73 for supporting the paper magazine 12 is disposed in a slidable fashion. The magazine table 73 is secured to a sliding desk 74 having a groove 74a. A roller 75a of an operating lever 75 is fitted in the groove 74a, and slides along the groove 74a when the operating lever 75 is turned about an axle 76. A sensor S4 detects if the magazine table 73 has moved by a predetermined amount. The sensor S1 for detecting that the leading end 15a of the photographic paper 15 is nipped between the first feed roller pair 13 and 14, consists of an LED 77 and a photo-sensor 78. The cover 57 is locked by a lock mechanism 79 in a closed condition.

Figure 4:
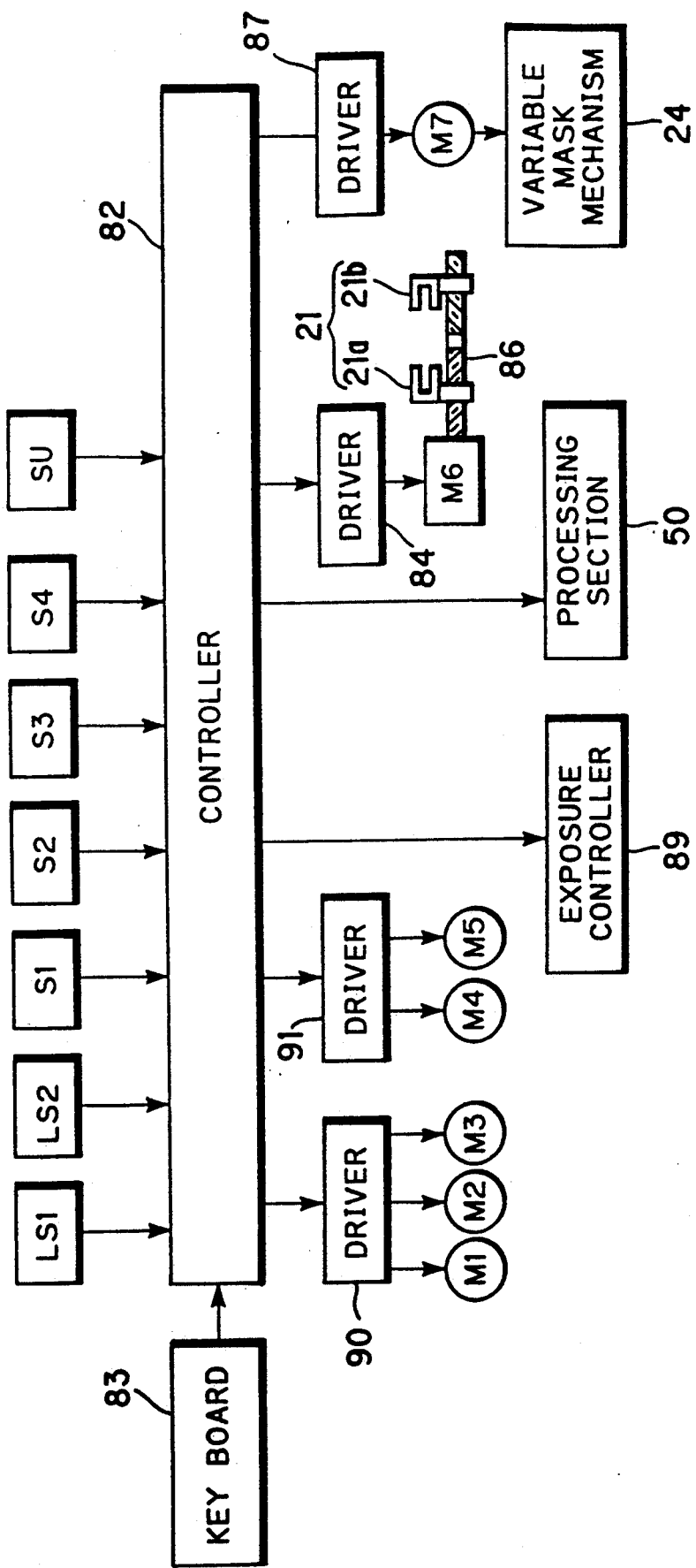
FIG. 4 is a block diagram of a control circuit of the preferred embodiment.

As shown in FIG. 4, the loop sensors LS1 and LS2, the sensors S1 to S4, and the sensor unit SU are all connected to the controller 82. A keyboard 83 is also connected to the controller 82, and the controller 82 sequentially controls respective elements of the printer processor 10. Specifically, the controller 82 rotates a pulse motor M6 through a drive 84 according to the paper data read by the sensor unit SU. The pulse motor M6 is coupled to a feed screw shaft 86, on which two screws whose leading directions are opposite to each other are formed. A pair of guide half members 21a and 21b of the paper guide 21 are engaged with these screws, so that the spacing between the two guide half members 21a and 21b is changed according to rotation of the feed screw shaft 86. It is to be noted that more than one paper guide 21 may be disposed along a paper transporting path, although only one paper guide 21 is shown in FIG. 1.

The controller 82 also drives a motor M7 through a driver 87, so as to adjust the size of the variable mask mechanism 24 according to the paper size and the print size. An exposure controller 89 includes a controller for the filters 27 to 29, a magnification adjuster for the lens 33, a driver for a shutter 32, a photometric unit for light measurement of each frame to be printed, and other known elements. Drivers 90 and 91 drive the motors M1 to M5.

Figure 5:
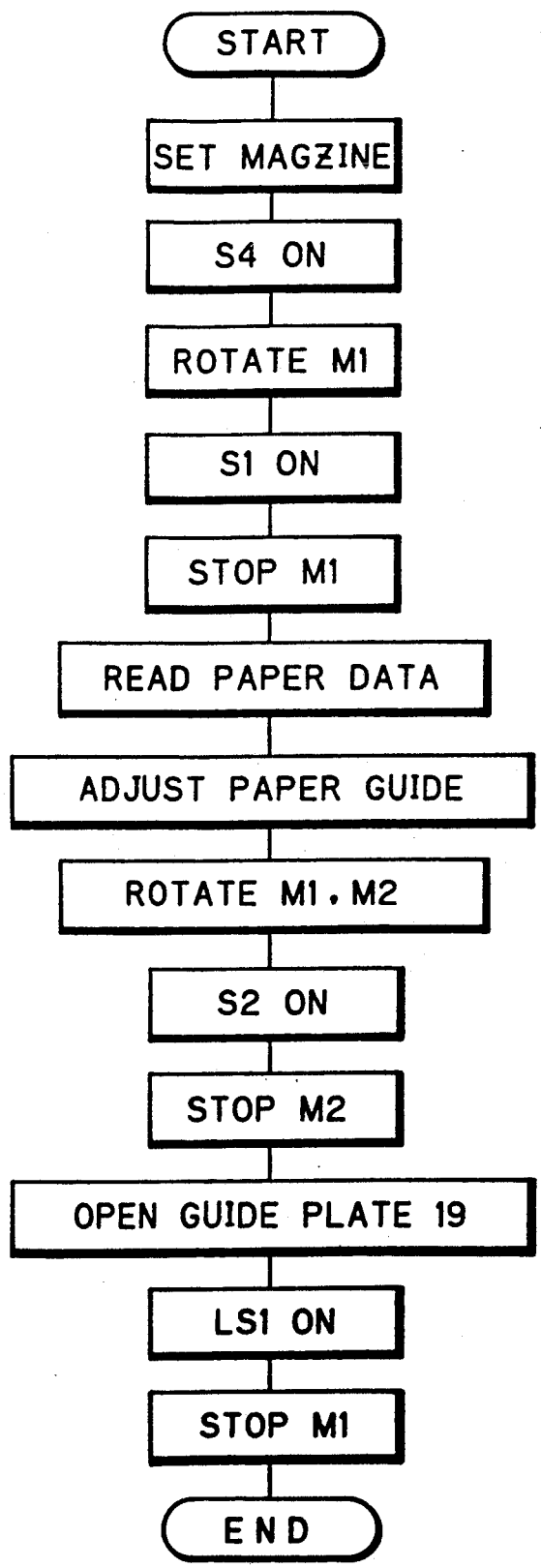
FIG. 5 is a flow chart of the control procedure performed by the control circuit during paper feeding.

The operation of the above-described embodiment will now be described with reference to FIG. 5.

When the cover 57 is opened in a dark room, the detector pin 66 is retracted through a transmission mechanism (not shown), so that the light-shielding member 64 opens the paper port 62. While the cover 57 is opened, a paper roll 15b is loaded in the magazine body 55, and a leading portion of the photographic paper 15 is inserted in the paper port 62 until the leading end 15a thereof appears in the cut-out 62a. When the cover 57 is closed after loading the paper roll 15b, the light-shielding member 64 moves into a shielding position, as shown in FIG. 2, wherein the light-shielding member 64 shields the inside of the paper port 62 from the external light, and nips the leading end 15a. Then, the cover 57 is locked in the closed condition by the lock mechanism 79.

Thereafter, the paper magazine 12 is placed on the magazine table 73 as shown in FIG. 2. When the operating lever 75 is turned counterclockwise, the sliding desk 74 begins to move to the left of FIG. 2, together with the table 73, by virtue of the engagement of the roller 75a with the groove 74a. When the sensor S4 is turned on while the table 73 is moving to the left, the controller 82 drives the pulse motor M1 so as to rotate the first pair of feed rollers 13 and 14.

The operating lever 75 is further turned counterclockwise so as to move the table 73 further to the left, until the paper magazine 12 is completely set in the printer processor 10 as shown in FIG. 3. Since the detector pin 66 is pushed by the projection 67 immediately before completion of magazine setting, the light-shielding member 64 is retracted so as to open the port 62.

Upon setting the paper magazine 12 in the printer processor 10, the rotating first feed rollers 13 and 14 are moved into the cut-out 62a of the paper port 62. As a result, the leading end 15a is held between the feed rollers 13 and 14 and is thus fed into the printer processor 10. When the leading end 15a, passing through the first feed rollers, 13 and 14, is detected by the sensor S1, rotation of the pulse motor M1 is stopped.

On the other hand, when the setting of the paper magazine 12 is completed, the sensor unit SU reads the paper data from the data section 70 and sends this data to the controller 82. According to the paper size data included in the paper data, the controller 82 rotates the pulse motor M6, so as to adjust the width of the paper guide 21 to the proper paper size. The controller 82 also rotates the motor M7, so as to adjust the size of the variable mask mechanism 24 to correspond to the print size. Furthermore, the controller 82 transfers the data relating to the paper surface type and the paper sensitivity to the exposure controller 89.

When the above-described preliminary adjustments are completed, the controller 82 starts the automatic paper loading by activating the pulse motors M1 and M2. When the first feed rollers 13 and 14 start rotating again, the photographic paper 15 is drawn from the paper magazine 12, while the paper leading end 15a is guided on the first guide plate 19 positioned in the first position shown by the chain-dotted line, toward the guide roller 20. Thereafter, the paper leading end 15a is fed to the main feed roller 40 through the paper guide 21 and the exposure station 17. The paper leading end 15a is held between the main feed roller 40 and the belt 44, and is fed toward the second loop forming section 52, because the main feed roller is rotated by the pulse motor M2. When the sensor S2 detects the paper leading end 15a, rotation of the pulse motor M2 is stopped.

After the stop of the pulse motor M2, the motor M4 is rotated to open the first guide plate 19, that is, swing the first guide plate 20 down to the retracted position shown by the solid line. Because the pulse motor M1 continues to rotate, a loop of the photographic paper 15 drawn from the paper magazine 12 is formed in the first loop forming section 16. When the loop sensor LS1 detects that the length of the loop extends beyond a predetermined length, which corresponds to at least the length of an image frame, the pulse motor M1 is stopped.

In this way, automatic paper loading is completed, and thus the printer processor stands ready for a printing procedure. After placing the photographic film 31 on the film carrier, the keyboard 83 is operated to issue printing commands. Then, the photometric unit of the exposure controller 89 measures each image frame to be printed. Based on the photometric value and the exposure data such as sensitivity and surface type, exposure amounts for three colors are calculated. The filters 27 to 29 are adjusted according to these exposure amounts. Thereafter, the shutter 32 is actuated to print the image frame placed in the exposure station 17 onto the photographic paper 15.

After each printing, the pulse motor M2 is rotated by a predetermined amount so as to advance the photographic paper 15 by one print frame. In this way, the exposed portion of the photographic paper 15 is transported toward the second loop forming section 52, while the unexposed portion is drawn from the first loop forming section 16. When the length of the loop in the first loop forming section 16 becomes less than a predetermined value, the loop sensor LS1 is turned on and the pulse motor M1 is rotated so as to feed the photographic paper 15 from the paper magazine 12 to the first loop forming section 16. The pulse motor M1 continues to rotate until the loop sensor LS1 is again turned off, so as to store the predetermined amount of loop of photographic paper 15 in the first loop forming section 16.

After printing a plurality of frames, the paper leading end 15a is fed to the second pair of feed roller pairs 48 and 49, while being guided on the second guide plate 46 positioned in the first position shown by the chain-dotted line. The second feed rollers 48 and 49 have been rotated by the pulse motor M3 from the start of the first printing, so that the paper leading end 15a is nipped between the second feed rollers 48 and 49, and is fed toward the processing section 50. When the sensor S3 disposed at the exit of the second feed rollers 48 and 49 detects the paper leading end 15a, the pulse motor M3 is stopped. Immediately thereafter, the motor M5 starts rotating so as to open the second guide plate 46, that is, swing the second guide plate 46 down to the retracted position shown by the solid line.

After the second guide plate 46 is opened, because the pulse motor M3 stops, the exposed photographic paper 15 is stored in the second loop forming section 52. When a predetermined amount of loop of photographic paper 15 is stored in the second loop forming section 52, the pulse motor M3 starts rotating, so as to feed the exposed photographic paper 15 into the processing section 50 at a constant speed. The photographic paper 15 is transported at the constant speed in the processing section 50, so as to be sequentially passed through a series of developing tanks.

While the present invention has been described in detail above with reference to a preferred embodiment shown in the drawings, it will be apparent to those skilled in the art that various changes and modifications of the present invention are possible without departing from the scope of the invention as defined by the appended claims.

What is claimed is:

1. An automatic paper loading system for a photographic printer comprising:
   a slidable magazine table for supporting thereon a paper magazine containing a roll of photographic paper;
   a first sensor positioned so as to output a first detection signal when said magazine table is slid toward a magazine final setting position;
   a pair of feed rollers positioned proximate an exit of said magazine, when said paper magazine is in said final setting position, so as to nip a leading end of said photographic paper and draw said photographic paper from said paper magazine into said photographic printer, said feed rollers being adapted to be positioned in a cut-out formed in said exit of said paper magazine when said magazine table is slid into said magazine final setting position;
   a motor coupled to said feed rollers so as to impart rotation thereto;
   a second sensor positioned so as to output a second detection signal when said paper leading end has passed through said feed rollers; and
   a control circuit coupled to said motor, said first sensor and said second sensor so as to activate said motor in response to said first detection signal, and to stop said motor in response to said second detection signal.

2. An automatic paper loading system as recited in claim 1, further comprising:
   a reading device in said photographic printer operatively coupled to a storage device in said paper magazine, when said magazine is in said final setting position, so as to read paper data from said storage device;
   a paper guide device positioned in said photographic printer to guide said photographic paper through a paper transporting system of said photographic printer; and
   an adjusting device positioned in said photographic printer so as to adjust the size of a paper passageway of said paper guide device in accordance with said paper data.

3. An automatic paper loading system as recited in claim 2, wherein said control circuit is coupled to said adjusting device so as to activate said motor to rotate again when said paper passageway has been adjusted after said motor has been stopped in response to said second detection signal.

4. An automatic paper loading system as recited in claim 3, wherein said paper data includes paper size data.

5. An automatic paper loading system as recited in claim 4, wherein said reading device is a photo-sensor for optically reading said paper data and said storage device is an optically readable symbol disposed on an external surface of said paper magazine.

6. An automatic paper loading system as recited in claim 4, wherein said paper guide device includes a pair of guide half members extending parallel to each other, a spacing between said guide half members defining a width of said paper passageway which is adjusted based upon said paper size data.

7. An automatic paper loading system as recited in claim 6, wherein said guide half members mesh with a pair of threads which are formed on a feed screw, said threads have opposite leading directions from each other, said feed screw being rotated so as to adjust the width of said paper passageway.

8. An automatic paper loading system as recited in claim 7, wherein said paper transporting system includes a plurality of said paper guide devices.

9. An automatic paper loading system as recited in claim 8, further comprising:
   adjusting means for adjusting a variable mask mechanism disposed in an exposure station for masking said photographic paper, in accordance with said paper size data and a designated print size.

10. An automatic paper loading system as recited in claim 2, wherein said magazine table is mounted on a sliding desk, said sliding desk having a groove formed therein and being coupled to a lever by virtue of engagement between a roller connected to said lever and said groove, said sliding desk being slid between an initial position and a final position, corresponding to said magazine final setting position, by rotating said lever from a first to a second terminal position.

11. An automatic paper loading system as recited in claim 6, wherein said first sensor is positioned to detect said sliding desk and outputs said first detections signal immediately before said sliding desk reaches said final position.

12. An automatic paper loading system as recited in claim 1, wherein said paper magazine is provided with a movable cover so as to allow loading of said photographic paper in said paper magazine and a light-shielding member positioned proximate said exit for shielding external light from entering said paper magazine, said light-shielding member opening said exit of said paper magazine when said cover is opened, and closing said exit to nip said leading end of said photographic paper when said cover is closed after said leading end is placed in said cut-out of said exit.

13. An automatic paper loading system as recited in claim 12, further comprising:
   a setting detector coupled to said paper magazine so as to detect a setting thereof which actuates said light-shielding member to open said exit of said paper magazine when said setting detector detects that said paper magazine reaches a predetermined position directly before a position which corresponds to said magazine final setting position.

14. An automatic paper loading system as recited in claim 13, wherein said setting detector includes a pin coupled to said light-shielding member, and a stationary projection disposed on said photographic printer in opposition to said pin, when said paper magazine is proximate said magazine final setting position, so as to push said pin into said paper magazine.

15. An automatic paper loading method for a photographic printer comprising the steps of:
   placing a paper magazine on a slidable magazine table;
   sliding said magazine table toward a magazine final setting position;

outputting a first detection signal immediately before said magazine table moves into said magazine final setting position;

rotating a pair of feed rollers in response to said first detection signal;

nipping and drawing out a leading end of photographic paper from said paper magazine by said feed rollers when said magazine table and said paper magazine are set in said magazine final setting position;

outputting a second detection signal when said leading end has passed through said feed rollers; and stopping rotation of said feed rollers in response to said second detection signal.

16. An automatic paper loading method as recited in claim 15, further comprising the steps of:

reading out paper data from said paper magazine;

adjusting a size of a paper passageway of a paper guide device in accordance with said paper data, after said feed rollers are stopped responsive to said second detection signal; and thereafter rotating said feed rollers again, so as to feed said photographic paper further into said photographic printer.

17. An automatic paper loading method as recited in claim 16, further comprising the step of:

adjusting a variable mask mechanism for masking said photographic paper in accordance with said paper data and designated print data while said feed rollers are stopped responsive to said second detection signal.

18. An automatic paper loading method as recited in claim 17, further comprising the step of:

actuating a light-shielding member to open an exit of said paper magazine when said paper magazine reaches a predetermined position directly before a position which corresponds to said magazine final setting position.

* * * * *